3,099,574
METHOD OF COLORING STONES AND OTHER MINERAL AGGREGATES
Napoleon M. Bernier, Belmont, Mass., assignor to California Stucco Products of N. E., Inc., Cambridge, Mass., a corporation of Massachusetts
No Drawing. Filed June 24, 1959, Ser. No. 822,420
2 Claims. (Cl. 117—100)

This invention relates to a process for providing colored aggregates for use in stucco, plaster, and asphalt facings and coatings.

A simplified flow diagram of the process is as follows:

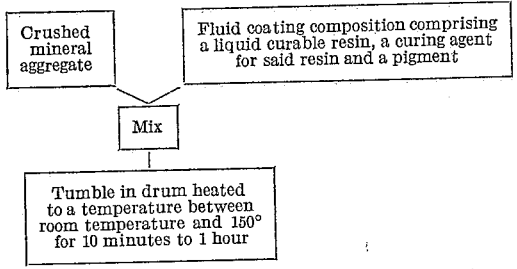

Colored stone or mineral aggregates are used extensively in the building and building materials industries. They are used in stucco or plaster facings, asphalt roof coatings, asphalt shingle coatings, and asphalt siding materials. They are also used as coloring mediums for walks and clay tennis courts.

Heretofore, different processes have been conceived for coloring mineral aggregates, and one has been recognized as the best. In this process, aggregates are colored by coating them with sodium silicate containing a pigment. The coated aggregates are heated to a temperature of 500–700° C. to dry the silicate coating. This process has several limitations, of which the most important is the high degree of heat required for drying the sodium silicate. Since heating degrades certain types of pigments, as, for example, cadmium and phthalocyanine pigments, only a narrow range of pigments resist to heat can be used in the sodium silicate process.

Accordingly, the object of this invention is to provide a new method of coloring mineral aggregates for use in asphalt shingles and the like.

A more specific object is to provide a method of coloring mineral aggregates which can be executed without application of any heat at all, whereby a wide range of pigments may be used to color the aggregates.

Other objects and many of the attendant advantages of this invention will be readily appreciated as reference is had to the following detailed description.

This invention contemplates the use of epoxy and unsaturated polyester resins as vehicles for pigments. The process of the invention comprises mixing together an epoxy or polyester resin, the curing agent for the resin, and a coloring agent, coating selected aggregates with the mixture, and keeping the aggregates in motion until the resin has reacted with the curing agent whereby to prevent the aggregates from adhering to each other.

As employed herein, the terms "epoxy resins" and "unsaturated polyester resins" are limited to specific materials. For the purposes of this invention, "epoxy resins" are composed of a polyether derivative of a polyhydric organic compound. More specifically, they are the complex resinous reaction products of epihalogenohydrins and polyhydric alcohols or phenols having at least two phenolic hydroxy groups. These resinous reaction products contain more than one (usually from one to two, but sometimes more than two) ethylene oxide group per molecule. These epoxy (sometimes referred to as "ethoxyline") resins are well known in the resin art, and suitable examples of epoxy resins may be found in U.S. Patents 2,324,483; 2,444,333; 2,494,295; 2,500,499; 2,500,600; 2,511,913; and 2,528,417. By reference, the aforementioned patents are intended to be part of the present description, both to facilitate the practice of this invention and also to outline the scope of the art embraced by the term "epoxy" resin as used herein.

For the purposes of the present invention, the epoxy resins may be prepared by effecting reaction between an epihalogenohydrin, such as epichlorohydrin, and a polyhydric phenol or alcohol, as, for example, ethylene glycol, propylene glycol, trimethylene glycol, triethylene glycol, tripropylene glycol, butylene glycol, diethylene glycol, phenol, hydroquinone, resorcinol, glycerine, erithritol, pentaerythritol, mannitol, sorbitol, polyvinyl alcohol, bis-(4-hydroxyphenyl) dimethylmethane, bis-(4-hydroxyphenyl) 2,2-propane, 4'4'-dihydroxybenzophenone, bis-(4-hydroxyphenyl) 1,1-ethane, bis-(4-hydroxyphenyl) 1,1-isobutane, bis-(4-hydroxyphenyl) 2,2-butane, bis-(4-hydroxy-2-tertiarybutylphenyl) methane, and 1,5-dihydroxynaphthalene. Other epoxy resins may also be used in the practice of this invention if they cure to a suitable hardness and stability. However, for the purposes of this invention, the preferred epoxy resin is the reaction product of epichlorohydrin and bis-phenol A.

In converting the epoxy resins to the cured state, many different catalysts or curing agents (both alkaline or acidic) may be employed. These include organic amino compounds such as diethylenetriamine, m-phenylenediamine, aminoethylethanolamine, dimethylamino ethanol, piperdine, pyridine, melamine, octylamine, decylamine, laurylamine, stearylamine; Friedel-Crafts metal halides like aluminum chloride, zinc chloride, ferric chloride, as well as complexes thereof with ethers, acid anhydrides, ketones, diazonium salts, etc.; phosphoric acid and partial esters thereof including n-butyl orthophosphate, diethyl orthophosphate, and hexaethyl tetraphosphate; alkalis such as sodium hydroxide and potassium hydroxide; alkali phenoxides such as sodium phenoxide; and carboxylic acids or their anhydrides such as formic acid, oxalic acid, and phthalic anhydride. The amount of hardening agent varies, depending upon the particular agent involved, but is usually in the range of 10–50 percent. The amino compounds are preferred, and these are used in amounts of 25–50 percent for rapid curing.

As used herein, the term "unsaturated polyesters" is to be construed to mean the ethylenically unsaturated polymeric ester reaction product of one or more ethylenically unsaturated polycarboxylic acids and one or more polyhydric alcohols. Phthalic, malic, maleic, fumaric, adipic, pimelic, suberic, sebacic, itaconic, citraconic, and succinic acids and their anhydrides are among the polycarboxylic acids that may be used to produce a polyester suitable for the present invention. Various polyhydric alcohols may be used, including but not limited to the glycols of ethylene, diethylene, propylene, dipropylene, 1,3-butylene, and 2,3-butylene. If desired, an unsaturated monohydric alcohol such as allyl alcohol may be used in place of some of the polyhydric alcohol or alcohols.

Preferably, the unsaturated polyesters are mixed with polymerizable, ethylenically unsaturated monomers such as styrene which cross-link with the double bonds of the unsaturated resin at the time of curing to produce a durable, hard, thermo-setting plastic. Among the polymerizable cross-linking monomers which may be used are the following: styrene, alpha methylstyrene, vinyl toluene, vinyl acetate, diallyl esters, and methyl methacrylate. The vinyl toluene may be o-vinyl, p-vinyl, or m-vinyl. Examples of diallyl esters are diallyl phthalate and triallyl cyanurate.

These polyester resins are converted from a fluid to a solid state and cured by means of a catalyst and an accelerator (sometimes called a "promoter"). The preferred catalyst is methylethyl ketone peroxide dissolved in dimethyl phthalate. This is commercially available as a 60 percent solution. However, other oxidizing catalysts known to polyester resin chemists may be used instead. These include benzoyl peroxide, dicumyl peroxide, and cumene hydroperoxide. The amount of preferred catalyst used may vary from as little as 0.5 percent to as much as 5 percent by weight of the total resin mixture. The other catalysts are used in the same concentrations.

Preferably, the accelerators are metallic salts of organic acids, and, in particular, the cobalt, manganese, and iron salts of naphthenic acid. A 6 percent cobalt naphthenate solution is preferred; it may be introduced into the system in quantities ranging from .1 percent to 1.6 percent by weight of the total resin mixture. The manganese and iron salts are used in the same quantities. Of course, other chemicals may be used as accelerators without departing from the principles of the present invention.

The following publication is referred to and incorporated by reference, both to facilitate comprehension and practice of the present invention and also to indicate the scope of the art which has been considered in connection with the present invention and which is embraced by the term "polyester resin" as employed herein:

Polyesters and Their Applications, prepared by Bjorksten Research Laboratories, Inc., published in 1956 by Reinhold Publishing Company, New York (Library of Congress, catalog No. 56–6688).

Although the process may be carried out without application of heat, it is preferred that the epoxy or polyester resin be heated slightly to expedite its "kicking over" to a non-tacky state. This cuts down the amount of time that the aggregates must be agitated and also assures that the aggregates will be loose when the resin has kicked over to a solid state. Moreover, in the case of aggregates which are easily pulverized, cutting down the agitating time where the agitating is done by means of a rotating drum also reduces the amount of fines or powder produced by abrasion of the aggregates with the drum.

Following are several examples of the present invention, the first of which is the preferred embodiment:

*Example I.*—Thirty ounces of the epoxy resin reaction product of bis-phenol A and epichlorohydrin are mixed with twelve ounces of triethylene amine, two ounces of dimethylamine ethanol, and two ounces of red iron oxide powder. This reactive mixture is added to an electrically heated drum containing 100 pounds of crushed stone having a particle size ranging from a fine sand large enough to be retained on a 50-mesh screen and small enough to pass through a 10-mesh screen. The drum is heated to a temperature of approximately 140° F. The drum is rotated at a constant speed of approximately 100 revolutions per minute. At the end of fifteen minutes, the drum is stopped and the stones removed. The stones will all have a non-tacky red plastic coating. After one hour, the plastic coating is hard.

*Example II.*—In this case, 130 pounds of crushed stone, as used in Example I, are placed in a drum with a fluid mixture prepared by mixing 3 pounds, 5 ounces of the polyester reaction product of 4 parts propylene glycol with approximately 3 parts phthalic anhydride and 2 parts maleic anhydride, 15 grams of a 60 percent solution of methylethyl ketone peroxide in dimethyl phthalate, 3 grams of 6 percent cobalt naphthenate, 1 pound of styrene, and 3 ounces of red iron oxide powder. The drum is unheated and is at a temperature of approximately 70° F. The drum is rotated at the same speed as in Example I for a period of fifteen minutes. At the end of that time, the stones have a non-tacky red plastic coating. After one hour, the plastic coating is hard.

*Example III.*—In this case, the conditions and materials are the same as in Example I, except that 2 ounces of cadmium yellow are used in place of the red iron oxide powder. At the end of fifteen minutes, the stones have a non-tacky bright yellow plastic coating.

*Example IV.*—In this case, the conditions and materials are the same as in Example II, except that 2 ounces of phthalocyanine blue are employed instead of the red iron oxide powder. At the end of 10 minutes agitation in the drum, the stones will have a non-tacky blue-colored plastic coating.

*Example V.*—In this case, 100 pounds of marble aggregates ranging in size from 1 inch down to $\frac{1}{32}$ of an inch are placed in the same drum with a reactive mixture comprising 3 pounds of the polyester resin reaction product of Example II, 1 pound of styrene, 12 grams of a 60 percent solution of methylethyl ketone peroxide in dimethyl phthalate, 2 grams of 6 perecnt cobalt naphthenate, and 2.5 ounces of phthalocyanine green. The drum is heated to a temperature of approximately 140° F. and rotated for 10–15 minutes. At the end of that time, the aggregates are green-colored but not sticky to the touch.

*Example VI.*—In this case, the conditions and materials are the same as in Example I, except that 2 ounces of titanium dioxide are used in place of the red iron oxide, and triethylene amine and dimethylamino ethanol are replaced by 15 ounces of diethylenediamine, and the drum is at a temperature of about 80° F. At the end of one hour of tumbling, the aggregates will have a white coating that is non-tacky and relatively hard.

Coatings applied as in the foregoing examples cure to a durable, mar-resistant state within several hours after application and have the advantage of a range of colors not hitherto available in the art. The size of the aggregates may vary from fines or powders to as much as 1 inch in diameter. This makes the invention applicable to interior and exterior stucco coatings as well as to roof and siding shingles and the like. Even more important, the epoxy and polyester resins will resist hot and cold water and most acids and alkalies, and the coatings containing them are light-fast when the proper pigments are used.

Moreover, it has been found that the temperature of the reactive system should not exceed 150° F. Temperatures of approximately 150° F. are easy and cheap to attain; higher temperatures are more costly to attain, do not materially speed up the reaction, and are more likely to cause the granules to set together as a solid mass. Although the drum may be preheated, it is preferred to heat the drum after the different materials have all been added. This permits the drum to be rotated at all times during applications of heat and positively prevents particles from adhering to one another. A material advantage of this process is that each batch of materials ties up a given drum for only a short time. The coated aggregates can be removed from the drum as soon as the coating is non-tacky. Final curing can occur outside the drum. Hence, in this process, each drum will have a greater daily output than is possible in systems requiring temperatures of 500–700° C.

It is to be understood that the examples, terms, and expressions which are employed in this specification are used for the purpose of description and not for the purpose of limiting or excluding equivalents and that within the scope of the appended claims, various modications, variations, extensions, and substitutions of equivalents may be made without departing from the principles of the invention as described or illustrated.

I claim:

1. A process for providing colored aggregates suitable for use in stucco, plaster and asphalt facing and coatings which comprises the steps of mixing a charge of mineral aggregates with a colored fluid resin surface coating composition substantially according to the proportions of the following formula per 100 lbs. of crushed stone:

Approximately 30 ounces of an epoxy resin reaction product of bisphenol A and epichlorohydrin.

25–50% by weight of the epoxy resin of an amine curing agent selected from the group consisting of diethylene diamine and a mixture of approximately one part by weight dimethylamino ethanol and 6 parts by weight triethylene amine; and an effective amount in the range of approximately 2 to 3 ounces of a coloring pigment and agitating said aggregates to coat the same and to disperse the aggregates.

2. A process for producing colored aggregates suitable for use in stucco, plaster and asphalt facings and coatings which comprises the steps of mixing a charge of mixed aggregates with a colored fluid resin surface coating composition substantially according to the proportion of the following formula per 130 lbs. crushed stone:

Approximately 3 lbs. of the polyester reaction product of 4 parts of propylene glycol with approximately 3 parts of phthalic anhydride and approximately 2 parts of maleic anhydride, 0.5 to 5% by weight of the polyester resin, of methyl ethyl ketone peroxide as a 60% solution in dimethyl phthalate, 0.1 to 1.6% by weight of the polyester resin of cobalt naphthenate as a 6% solution, Approximately 1 lb. of styrene, and an effective amount in the range of approximately 2 to 3 ounces of a coloring pigment and agitating said aggregates to coat the same and to disperse the aggregates.

References Cited in the file of this patent

UNITED STATES PATENTS

| | | |
|---|---|---|
| 1,838,287 | Schreurs | Dec. 29, 1931 |
| 2,282,479 | Johnston | May 12, 1942 |
| 2,807,556 | Stark | Sept. 24, 1957 |
| 2,861,011 | Asbeck et al. | Nov. 18, 1958 |
| 2,871,420 | Minter et al. | Jan. 27, 1959 |
| 2,930,106 | Wrotnowski | Mar. 29, 1960 |